United States Patent [19]
Geist et al.

[11] Patent Number: 5,120,774
[45] Date of Patent: Jun. 9, 1992

[54] WATER-DILUTABLE BINDERS, CONTAINING LATENT PRIMARY AMINO GROUPS, FOR CATIONIC ELECTROCOATING FINISHES, AND A PROCESS FOR THEIR PREPARATION

[75] Inventors: Michael Geist; Günther Ott, both of Münster; Georg Schön, Everswinkel, all of Fed. Rep. of Germany

[73] Assignee: BASF Lacke & Farben AG, Münster, Fed. Rep. of Germany

[21] Appl. No.: 631,538

[22] Filed: Dec. 21, 1990

Related U.S. Application Data

[60] Division of Ser. No. 474,259, Feb. 5, 1990, Pat. No. 4,980,399, which is a continuation of Ser. No. 185,147, Apr. 22, 1988, abandoned, which is a division of Ser. No. 10,196, Jan. 23, 1987, Pat. No. 4,762,903.

[30] Foreign Application Priority Data

Apr. 6, 1985 [DE] Fed. Rep. of Germany ....... 3519953

[51] Int. Cl.$^5$ .......................... C08L 63/00; C09D 5/44; C25D 13/00
[52] U.S. Cl. .................... 523/415; 523/416; 523/417; 525/510; 528/45; 528/107; 204/181.7
[58] Field of Search ...................... 523/415, 417, 416; 528/107, 121, 229, 407; 204/181.7

[56] References Cited

U.S. PATENT DOCUMENTS 4,980,399 12/1990 Geist et al. ..................... 523/415

Primary Examiner—Melvyn I. Marquis
Assistant Examiner—Christopher P. Rogers
Attorney, Agent, or Firm—Kenyon & Kenyon

[57] ABSTRACT

The invention relates to water-dilutable binders for cationic electrocoating finishes, the said binders containing latent primary amino groups. In order to prepare the binders, an epoxy resin is reacted with a polyamine, which in addition to a sterically hindered primary amino group also contains at least one primary amino group blocked by reaction with a ketone or aldehyde, and, if appropriate, further primary or secondary amines.

10 Claims, No Drawings

WATER-DILUTABLE BINDERS, CONTAINING LATENT PRIMARY AMINO GROUPS, FOR CATIONIC ELECTROCOATING FINISHES, AND A PROCESS FOR THEIR PREPARATION

This application is a division of application Ser. No. 474,259, filed Feb. 5, 1990 now U.S. Pat. No. 4,980,399 which is a continuation of 07/185,147 filed Apr. 22, 1988 now abandoned which is a divisional of 07/010,196 filed Jan. 23, 1987 now U.S. Pat. No. 4,762,903.

The present invention relates to water-dilutable binders for cationic electrocoating finishes, which binders contain latent primary amino groups and are based on reaction products of epoxy resins and polyamines, which contain at least one blocked primary amino group, and, if required, further primary and/or secondary amines.

Cationic electrocoating is a coating process frequently used, in particular, for priming, and in which water-dilutable synthetic resins carrying cationic groups are applied onto electrically conductive articles with the aid of direct current.

The use of modified epoxy resins as binders for cationic electrocoating finishes is known. Water-dilutable modified epoxy resins can be obtained, for example, by reacting polyepoxide compounds with amines and, if appropriate, further modifiers (U.S. Pat. No. 4,104,147).

Modified epoxy resins prepared in this manner contain secondary and tertiary amino groups. It is assumed that the low basicity of the tertiary amino groups, in particular, is responsible for the fact that the binders obtained from reaction products of polyepoxide compounds with amines are only poorly dispersible in water and give aqueous systems having a low pH.

In order to overcome these difficulties, attempts were made to introduce primary amino groups into the epoxide binders. This objective was achieved by reacting polyepoxide compounds with a (poly)ketimine containing secondary amino groups or containing hydroxyl groups, and then liberating the protected primary amino group or groups by hydrolysis. (U.S. Pat. No. 3,947,339, U.S. Pat. No. 4,017,438, U.S. Pat. No. 4,104,147 and U.S. Pat. No. 4,148,772).

It has been found that the water dispersibility and the electrical deposition properties of the modified epoxy resins are substantially more advantageously affected by increasing the content of primary amino groups than by increasing the content of tertiary amino groups.

Since low molecular weight amines have an adverse effect on the surface properties of the electrically deposited layer, care should be taken to ensure that the binders are free of unconverted amine derivatives.

When primary amino groups are introduced via ketimines containing secondary amino groups, tertiary amino groups, which are not very advantageous, are formed, whereas when ketimines containing hydroxyl groups are used, lower reactivity and selectivity have to be accepted as disadvantages.

It is an object of the present invention to provide water-dilutable modified epoxy resins which have a very high content of primary amino groups and are free of low molecular weight amines.

This object is achieved, according to the invention, if the binders are prepared from A) an epoxy resin and B) a reaction product obtained by reacting a ketone or aldehyde with a polyamine which contains not only a sterically hindered primary amino group but also at least one further primary amino group, and, if required, further C) primary or secondary amines, and the primary amino groups are then liberated by hydrolysis.

The particular advantages achieved with the invention are that, in addition to the raw material base being extended, the component containing the latent primary amino groups is linked to the epoxy resin via a sterically hindered primary amino group, with the result that instead of the tertiary amino groups, which are not very advantageous, more strongly basic secondary amino groups containing an active H atom are formed, and because of the high reactivity and selectivity of the primary amino group, rapid and quantitative conversions are achieved.

All compounds which contain at least one reactive epoxide group, preferably two reactive epoxide groups, can be employed as component A.

The molecular weight of component A is preferably in the range from 350 to 2000.

Preferred epoxy resins are polyglycidyl ethers of polyphenols, these ethers being prepared from polyphenols and epihalohydrins. For example, the following compounds can be used as polyphenols: 2,2-bis-(4-hydroxyphenyl)-propane, 4,4'-dihydroxybenzophenone, 1,1-bis-(4-hydroxyphenyl)-ethane, 1,1-bis-(4-hydroxyphenyl)-isobutane, 2,2-bis-(4-hydroxy-tert.-butyl-phenyl)-propane, bis-(2-hydroxynaphthyl)-methane, 1,5-dihydroxynaphthalene and phenolic novolak resins.

Polyglycidyl ethers of polyhydric alcohols such as ethylene glycol, diethylene glycol, triethylene glycol, 1,2-propylene glycol, 1,3-propylene glycol, pentane-1,5-diol, hexane-1,2,6-triol, glycerol and 2,2-bis-(4-hydroxycyclohexyl)-propane, are also suitable.

Polyglycidyl esters of polycarboxylic acids, such as, for example, oxalic acid, succinic acid, glutaric acid, terephthalic acid, napthalene-2,6-dicarboxylic acid, dimerized linoleic acid, etc., can also be used. Typical examples are glycidyl adipate and glycidyl phthalate.

Hydantoin epoxides and polyepoxide compounds which are obtained by epoxidation of an olefinically unsaturated alicyclic compound are also suitable.

It is also possible to use epoxy resins which have been modified by reaction with A) Low molecular weight and/or high molecular weight compounds containing carboxyl groups, such as, for example, saturated or unsaturated monocarboxylic acids for example benzoic acid, linseed oil fatty acid, 2-ethylhexanoic acid or Versatic acid), aliphatic, cycloaliphatic and/or aromatic dicarboxylic acids of various chain lengths (for example adipic acid, sebacic acid, isophthalic acid, or dimeric fatty acids), hydroxyalkylcarboxylic acids (for example lactic acid or dimethylolpropionic acid) and polyesters containing carboxyl groups, and/or B) Low molecular and/or high molecular weight compounds containing amino groups, such as diethylamine or ethylhexylamine, or diamines possessing secondary amino groups, for example N,N'-dialkylalkylenediamines, such as dimethylethylenediamine, N,N'-dialkyl polyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethylpolyoxypropylenediamines, polyaminoamides, such as versamides, or the reaction product of one mole of diaminohexane with two moles of monoglycidyl ethers or monoglycidyl esters, especially glycidyl esters of α-branched fatty acids, such as Versatic acid, and/or C) Low molecular weight and/or high molecular weight compounds containing hydroxyl groups, such as neopentyl glycol, bis-oxyethylated neopentyl glycol, neopentyl glycol hydroxypivalate, dimethylhydantoin-N,N'-diethanol, hexane-1,6-diol, hexane-2,5-diol, 1,4-bis-(hydroxymethyl)-cyclohexane, 1,1-isopropylidene-bis-(p-phenoxy)-2-propanol, trimethylolpropane, pentaerythritol or amino alcohols, such as triethanolamine, methyldiethanolamine or alkylketimines containing hydroxyl groups, such as aminomethylpropane-1,3-diol-methyl-isobutyl-ketimine or tris-(hydroxymethyl)-aminomethane-cyclohexanone ketimine, and polyglycol ethers, polyester polyols, polyether polyols, polycaprolactone polyols and polycaprolactam polyols of various functionalities and molecular weights and/or D) methyl esters of saturated or unsaturated fatty acids, which are transesterified with hydroxyl groups of the epoxy resins in the presence of sodium methylate and/or E) compounds containing thiol groups and/or F) sulfide/acid mixtures and/or G) phosphine/acid mixtures and still possess free epoxide groups.

The modified epoxy resins disclosed in CA 1179443 are particularly preferably used.

In preparing component B, the sterically unhindered primary amino groups of the polyamine are blocked by reaction with a ketone or an alkdhyde. The use of the ketones, which are less reactive toward the aldehydes, have the advantage that the ketones eliminated after the hydrolytic liberation of the primary amino groups do not give rise to any technical problems when present in the electrocoating bath. Apart from the advantage of higher reactivity, use of aldehydes has the disadvantage that the eliminated aldehydes are expected to be oxidized in the coating bath to the corresponding carboxylic acids when the residence time is long, and consequently technical difficulties may occur.

Ketones of the general structural formula I are suitable for the preparation of component B.

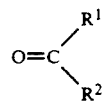 (I)

$R^1$ and $R^2$ are organic groups which are chemically inert during ketimine formation. $R^1$ and $R^2$ are preferably alkyl radicals of 1 to 4 carbon atoms. It is frequently advantageous to use a ketone which readily distills over with water.

Preferred examples of ketones include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone and acetophenone. Particularly preferred ketones are acetone, methyl ethyl ketone and methyl isobutyl ketone.

Compounds of the general structural formula II are suitable aldehydes.

 (II)

$R^3$ is an organic group, preferably an alkyl or aryl group. It is advantageous to use an aldehyde which readily distills over with water. Typical examples of aldehydes which may be used are acetaldehyde, propionaldehyde, butyraldehyde, isobutyraldehyde and benzaldehyde. Acetaldehyde is particularly preferred.

In addition to containing a sterically hindered primary amino group, the polyamines which may be used for the preparation of component B must also contain at least one further primary amino group. Sterically hindered primary amino groups are understood as meaning primary amino groups which, because of steric effects, are shielded from attack by bulky reactants.

Preferred polyamines are unsubstituted or substituted alicyclic or aliphatic polyamines which, in addition to a sterically hindered primary amino group, also contain at least one further primary amino group. Unsubstituted or substituted alicyclic or aliphatic polyamines which, in addition to a primary amino group sterically hindered by one α-alkyl group or by two α-alkyl groups, also contain at least one further primary amino group are particularly preferred.

Polyamines, which are based on formula II below

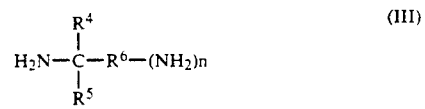 (III)

wherein $R^4$ is alkyl of 1 to 5 carbon atoms, preferably methyl, ethyl or propyl, $R^5$ is H or $R^4$, $R^6$ is unsubstituted or substituted alkylene of 1 to 20 carbon atoms, preferably —$(CH_2)_m$— where m is 1–10, and n is 1, are very particularly preferred.

Typical examples of polyamines which are suitable for the preparation of component B are trimethylhexamethylene-1,6-diamine, isophoronediamine, propane-1,2-diamine and 1,2-diamono-2-methylpropane.

In a preferred process for the preparation of component B, the carbonyl component and the polyamine in a suitable solvent (for example xylene, toluene or n-hexane) are heated, and the water of reaction is removed by azeotropic distillation. If about 1 mole of ketone or aldehyde is employed per mole of primary amino groups to be blocked, as a rule all sterically unhindered primary amino groups are blocked.

The primary or secondary amines used as component C should as far as possible be water-soluble compounds. For example, mono- and dialkylamines, such as methylamine, ethylamine, propylamine, butylmine, dimethylamine, diethylamine, dipropylamine, methylbutylamine, etc., can be used. Alkanolamines, such as, for example, methylethanolamine and diethanolamine, are also suitable. Dialkylaminoalkylamines, such as, for example, dimethylaminoethylamine and diethylaminopropylamine, can also be employed.

Low molecular weight amines are used in most cases, but it is also possible to employ relatively high molecular weight monoamines, particularly when it is intended to increase the flexibility of the resin by incorporating such amines. In a similar manner, it is also possible to use mixtures of low molecular weight amines and higher molecular weight amines for modifying the resin properties.

The invention also embraces a process for the preparation of the binders, wherein A) an epoxy resin is reacted with B) a reaction product obtained by reacting a ketone or aldehyde with a polyamine, which in addition to a sterically hindered primary amino group also contains at least one further primary amino group, and, if required, also with a further C) primary or secondary amine, and the primary amino groups are liberated by hydrolysis.

The reaction of the epoxy resin with component B is frequently exothermic. In order to complete the reaction, it may be useful in some cases to heat the reaction mixture to 40°–130° C. The reaction conditions should be chosen so that the blocked primary amino groups are liberated only when there is no longer any possibility of the formation of higher molecular weight products. The primary amino group is liberated hydrolytically on dilution with water.

The reaction of the epoxy resin with component C is often exothermic and may be carried out either before or after the reaction with component B. Depending on the desired course of the reaction, it is advisable to increase the reaction temperature to 130° C.

By determining the epoxide equivalent weight in each case, the course of the reactions of the epoxy resin with components B and C can be monitored.

Water-dilutability of the binders is achieved by neutralization of the amino groups with water-soluble acids (for example formic acid, acetic acid or phosphoric acid).

The binders prepared according to the invention can be crosslinked by the addition of crosslinking agents by conventional methods, or can be converted to self-crosslinking systems by chemical modification. The self-crosslinking system can be obtained, for example, by reacting the binder with a partially blocked polyisocyanate which possesses on average one free isocyanate group per molecule and whose blocked isocyanate groups are unblocked only at elevated temperatures.

Frequently used methods for the crosslinking of binders have been published in, for example, the following documents: GB-1 303 480-A, EP 12 463 and U.S. Pat. No. 4,252,703, U.S. Pat. No. 4,364,860 and GB 1 557 516-A.

Examples of suitable aminoplast crosslinking agents are the hexamethyl ether of hexamethylolmelamine, the triethyltrimethyl ether of hexamethylolmelamine, the hexabutyl ether of hexamethylolmelamine and the hexamethyl ether of hexamethylolmelamine, and polymeric butylated melamine/formaldehyde resins. Alkylated urea/formaldehyde resins may also be used. Blocked polyisocyanates, too, may be employed as crosslinking agents. In the invention, it is possible to use any polyisocyanates in which the isocyanate groups have been reacted with a compound so that the blocked polyisocyanate formed is stable toward hydroxyl groups at room temperature but reacts at elevated temperatures, as a rule in the range from about 90° to about 300° C. In the preparation of the blocked polyisocyanates, any organic polyisocyanates suitable for the crosslinking reaction can be used. The isocyanates which contain about 3 to about 36, in particular about 8 to about 15, carbon atoms, are preferred. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-diphenylene diisocyanate, 1,5-naogthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyantophenyl)-methyl 4,4'-diisocyanatodiphenyl ether and 2,3-bis-(8-isocyanatooctyl)-4-octyl-5-hexylcyclohexene.

It is also possible to use polyisocyanates of higher isocyanate functionality. Examples of these are tris-(4-isocyanatophenyl)-methane, 1,3,5-triisocyanatobenzene, 2,4,6-triisocyanatotoluene, 1,3,5-tris-(6-isocyanatohexyl)-biuret, bis-(2,5-diisocyanato-4-methylphenyl)-methane and polymeric polyisocyanates, such as dimers and trimers of diisocyanatotoluene. It is also possible to use mixtures of polyisocyanates. Other organic polyisocyanates which are suitable as crosslinking agents for the invention may be prepolymers which are derived from, for example, polyol, including a polyether polyol or a polyester polyol.

Any suitable aliphatic, cycloaliphatic or aromatic alkyl monoalcohols can be used for blocking the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols, such as cyclopentanol and cyclohexanol; and aromatic alkyl alcohols, such as phenylcarbinol and methylphenylcarbinol.

Other suitable blocking agents are hydroxylamines, such as ethanolamine, and oximes, such as methyl ethyl ketoxime, acetone oxime and cyclohexanone oxime. In suitable proportions, the stated polyisocyanates and blocking agents can also be used for the preparation of the partially blocked polyisocyanates described above.

Generally used additives, such as, for example, coalescing solvents, pigments, surfactants, crosslinking catalysts, antioxidants, fillers and antifoams, can be added to the aqueous coating compositions prepared using the binders according to the invention.

Aqueous systems prepared using the binders according to the invention are particularly suitable for the cationic electrocoating process; however, they may also be employed in conventional coating processes. For example, metals which may or may not have been pretreated, such as iron, steel, copper, zinc, brass, magnesium, tin, nickle, chromium and aluminum, as well as impregnated paper and other electrically conductive substrates may be used as substrates for coating.

The examples which follow illustrate the invention in more detail. Parts and percentages are by weight, unless expressly stated otherwise.

I. PREPARATION OF A DIAMINO-MONOKETIMINE 853.3 g of 1,2-propylenediamine (11.5 moles), 1153.9 g of methyl isobutyl ketone (11.5 moles) and 200 g of n-hexane are weighed into a reaction vessel equipped with a stirrer, an internal thermometer, an inert gas feedline and a water separator and connected to an upstream Raschig column, and the mixture is heated to 90° C., at which point the first water-containing distillate is obtained. As the reaction progresses, the temperature is increased stepwise to 105° C. and kept at this value until no further water of reaction separates off and the theoretical amount of 200 g of water is approximately reached. The product is then stored under nitrogen. The solution has an amine equivalent weight of 87.5 and a theoretical solids content of 89.3%.

Analysis of the distillate gives a 1,2-propylenediamine loss of 2.8% (determined titrimetrically) and a methyl isobutyl ketone loss of 0.05% (determined by gas chromatography).

II. PREPARATION OF THE BINDER I 2004 parts of an epoxy resin based on bisphenol A and having an epoxide equivalent weight of 501 and 312 parts of xylene are initially taken in a suitable reactor and heated to 115° C. The resulting traces of water are removed by separating them off under slightly reduced pressure. 105 parts of hexylglycol are then added, and the mixture is cooled to 70° C. 157 parts of diethanolamine are then added dropwise in the course of 30 minutes, and the mixture is kept at this temperature for 2 hours. Thereafter, 630 parts of a reaction product of 1 mole of hexamethylenediamine and 2 moles of Cardura E 10 (commercial product from shell) are added, and the temperature is increased to 120° C. After one hour, the mixture is cooled and, during this procedure, 195 parts of secondary butanol are added. When the temperature has reached 70° C., 84 parts of the monoketimine (I) described above are added, and the temperature is increased to 80° C. in the course of 1 hour. After a further 2 hours, the mixture is cooled and the product is discharged. A clear resin solution having the following characteristics is obtained:

Solids content (1 hour at 130° C.): 82.5%
MEQ base: 1.5 meq/g
Viscosity (40% strength in propyleneglycol monomethyl ether): 3.0 dPas

III. PREPARATION OF A BINDER II 1827 parts of a commercial bisphenol A epoxy resin (epoxide equivalent weight 188), 212 parts of dodecylphenol and 63 parts of xylene are initially taken in a suitable reactor and heated to 130° C. 12 parts of dimethylbenzylamine are added and, after a brief exothermic reaction, the temperature is kept at 132° C. When an epoxide equivalent weight of 400 has been reached, a further 298 parts of dodecylphenol are added, and the reaction is continued until an epoxide equivalent weight of 720 is reached. Thereafter, the mixture is diluted with 229 parts of xylene and 162 parts of hexylglycol and cooled at the same time. At 85° C., 255 parts of diethanolamine are added and the temperature is kept at this level until the total content of epoxide and amine has reached 1.28 meq/g. 79 parts of the monoketimine from Example I are then added. The temperature is increased to 115° C. in the course of 2 hours and kept at this level for a further hour, after which the mixture is cooled for a short time and the product then discharged. The product has the following characteristics:

Solids content (1 hour at 130° C.): 85.5%
MEW base: 1.45 meq/g
Viscosity (40% strength in propyleneglycol monomethyl ether): 1.0 dPas

PREPARATION OF CROSSLINKING AGENTS

To obtain highly resistant coatings, it is advantageous to cure the binders by means of a chemical reaction by admixing a crosslinking agent. Examples of crosslinking agents with which the binders according to the invention form stable mixtures at room temperature and undergo crosslinking on heating are described below.

CROSSLINKING AGENT I

A blocked isocyanate crosslinking agent (polyurethane crosslinking agent) is prepared as described in German Laid-Open Application DOS 2,701,002, Example I, by adding 218 parts of 2-ethylhexanol slowly to 291 parts of an 80:20 isomer mixture of 2,4-/2,6-toluylene diisocyanate while stirring and in a nitrogen atmosphere, the reaction temperature being kept below 38° C. by external cooling. The mixture is kept at 38° C. for a further half an hour and then heated to 60° C., after which 75 parts of trimethylolpropane and then, as a catalyst, 0.08 part of dibutyltin dilaurate are added. After an initial exothermic reaction, the mixture is kept at 121° C. for 1.5 hours until all the isocyanate groups have essentially been consumed, which can be detected from the infrared spectrum. The mixture is then diluted with 249 parts of ethylene glycol monoethyl ether.

CROSSLINKING AGENT II

A polyester crosslinking agent is prepared as described in European Patent 0 040 8687, Example 2d): 192 parts of trimellitic anhydride and 500 parts of glycidyl Versatate, having an epoxide equivalent weight of 250, are mixed, and the mixture is heated to 100° C., while stirring. An exothermic reaction occurs and the temperature increases to 190° C. After the mixture has been cooled to 140° C., 2 parts of benzyldimethylamine are added. The mixture is kept at 140° C. for 3 hours. A viscous, clear product is formed, and is additionally diluted with 295 parts of ethylene glycol monobutyl ether.

V. PREPARATION OF AQUEOUS DISPERSIONS I–III

To prepare the aqueous dispersions, the binder is initially taken together with butylglycol, an antifoam, glacial acetic acid and deionized water (item 1) and homogenization is carried out for 30 minutes with stirring. The crosslinking agent and the catalyst are then added. After homogenization for a further 30 minutes, the mixture is slowly diluted with deionized water (item 2) until the stated final solids content is reached. The dispersions are then subjected to vacuum distillation for a short time, the volatile solvents being separated off from the distillate, as an or iic phase.

| Dispersions | I | II | III |
| --- | --- | --- | --- |
| Binder I | 910 | — | — |
| Binder II | — | 917 | 917 |
| Crosslinking agent I | — | — | 480 |
| Crosslinking agent II | 528 | 480 | — |
| Dibutyltin dilaurate | — | — | 11.2 |
| Lead(II) octoate solution (24% of Pb) | 33 | 33 | — |
| Butylglycol | — | — | 70 |
| Antifoam solution | 1.1 | 1.1 | 1.1 |
| Glacial acetic acid | 30.4 | 29.0 | 29.0 |
| Deionized water I | 737 | 738 | 761 |
| Deionized water 2 | 1493 | 2240 | 1154 |
| Solids content (60 minutes at | 30.7% | 27.8% | 33.4% |

-continued

| Dispersions | I | II | III |
|---|---|---|---|
| 130° C.) | | | |

PREPARATION OF THE ELECTROCOATING BATHS AND DEPOSITION OF SURFACE COATING FILMS

In order to test them as cathodic electrocoating finishes, the aqueous binder dispersions described above are brought to a solids content of 25% with deionized water. 165 parts of the pigment paste described below are introduced into 1000 parts of the particular binder dispersion, while stirring. The solids content of the bath is then reduced to 20% (30 minutes at 150° C.) with deionized water.

PIGMENT PASTE

A paste binder is prepared according to Example 1 a) of German Laid-Open Application DOS 3,121,765. To do this, 200 parts of ethylene glycol monobutyl ether are heated to 90° C. in a reaction vessel. A mixture of 396 parts of N-vinylpyrrolidone, 204 parts of vinyl propionate and 1.2 parts of azobisisobutyronitrile is then added dropwise in the course of 2 hours. Finally, polymerization is continued for 1 hour at 90° C. The resulting solution polymer has a Fikentscher K value of 24. A solids content of the copolymer solution is 76%.

250 parts of the above copolymer solution, 210 parts of ethylene glycol monobutyl ether, 555 parts of ethylene glycol monoethyl ether, 837 parts of water, 1084 parts of kaolin, 217 parts of basic lead silicate, 145 parts of carbon black, 36 parts of rutile and 3000 parts of glass beads having a diameter of 2 mm are stirred in a stirred ball mill for 45 minutes at a speed of 1000 rpm. After the glass beads have been separated off, a black paste having a solids content of 50.6% is obtained.

The electrocoating baths are allowed to age for 3 days at 30° C., while stirring. The surface coating films are deposited in the course of 2 minutes at the specified voltage onto zinc-phosphatized steel specimen panels which have been connected as the cathode. The bath temperature is 27° C. The wet films deposited are washed with deionized water and baked for 20 minutes at 180° C. and 160° C. (Table on page 20).

| Finish from | | Dispersion I | Dispersion II | Dispersion III |
|---|---|---|---|---|
| Deposition voltage | V | 350 | 300 | 300 |
| Film thickness | μm | 23 | 29 | 26 |
| Ford throwing power | cm (V) | 19.8 | 21.3 | 20.7 |
| Leveling properties[+] | | 2 | 2 | 1 |
| Crosshatch test[+] | | 0 | 0 | 0 |
| Erichsen cupping | mm | 7.4 | 9.8 | 8.2 |
| Reverse impact | (in × lb) | 120 | 160 | 100 |
| Crosslinking[++] | | 0 | 0 | 0 |
| Baking temperature | °C. | 170 | 170 | 180 |

[+] 0 best value, 5 poorest value
[++] 20 double strokes with an MIBK-impregnated cottonwool ball
0 = surface not attacked

We claim:

1. A method of coating a substrate by cathodic electrodeposition of a water-dilutable binder containing latent primary amino groups and is based on reaction products of epoxy resins and polyamines, which contain at least one primary amino group blocked by ketiminization, and, if appropriate, further primary and/or secondary amines, wherein the binder is prepared from
   (A) an epoxy resin and
   (B) a reaction product obtained by reacting a ketone with a polyamine, which in addition to a sterically hindered primary amino group also contains at least one further primary amino group, and, if appropriate, further
   (C) primary and/or secondary amines.

2. A method of coating a substrate by cathodic electrodeposition of a water-dilutable binder containing latent primary amino groups and is based on reaction products of epoxy resins and polyamines, which contain at least one blocked primary amino group, and, if appropriate, further primary and/or secondary amines, wherein the binder is prepared from
   (A) an epoxy resin and
   (B) a reaction product which is obtained by reacting an aldehyde with a polyamine, which in addition to a sterically hindered primary amino group also contains at least one further primary amino group, and, if appropriate, further
   (C) primary and/or secondary amines.

3. The method in claim 1 or 2, wherein the amount of ketone or aldehyde used in preparation of component (B) is chosen so that all sterically unhindered primary amino groups of the polyamine are blocked.

4. The method of claim 1 or 2, wherein the polyamine used is an unsubstituted or substituted alicyclic or aliphatic polyamine which in addition to a sterically hindered primary amino group also contains a further primary amino group.

5. The method of claim 1 or 2, wherein the polyamine used is an unsubstituted or substituted alicyclic or aliphatic α-alkyl-substituted polyamine.

6. The method of claim 1 or 2, wherein the sterically hindered polyamine used is a polyamine of the formula III:

$$H_2N-\underset{\underset{R^5}{|}}{\overset{\overset{R^4}{|}}{C}}-R^6-(NH_2)_n$$

where $R^4$ is alkyl of 1 to 5 carbon atoms, preferably methyl, ethyl or propyl, $R^5$ is H or $R^4$, $R^6$ is unsubstituted or substituted alkylene of 1 to 20 carbon atoms, preferably $(CH_2)_m$ where $m=1-10$, and $\geq 1$.

7. The method of claim 1 or 2, wherein the polyamine used is 1,2-propanediamine.

8. The method of claim 1 or 2, wherein the polyamine used is 1,2-diamino-2-methylpropane.

9. The method in claim 3, wherein a mixture of various ketones and/or aldehydes is used in the preparation of component B.

10. The method of claim 1 or 2, wherein a mixture of various polyamines is used in the preparation of component B.

* * * * *

UNITED STATES PATENT AND TRADEMARK OFFICE
CERTIFICATE OF CORRECTION

PATENT NO. : 5,120,774
DATED : June 9, 1992
INVENTOR(S) : Michael Geist et al.

It is certified that error appears in the above-identified patent and that said Letters Patent is hereby corrected as shown below:

Column 4, line 29, change "II" to --III--.

Column 6, line 10, change "naogthylene" to --naphthylene--.

Column 6, line 13, change "methyl" to --methane--.

Column 8, line 2, change "PREPARTION" to --IV. PREPARATION--.

Column 8, line 54, change "or iic" to --organic--.

Column 9, line 7, change "PREPARATION" to --VI. PREPARATION--.

Signed and Sealed this

Second Day of August, 1994

Attest:

BRUCE LEHMAN

*Attesting Officer*  *Commissioner of Patents and Trademarks*